United States Patent [19]

Büter et al.

[11] Patent Number: 4,633,665

[45] Date of Patent: Jan. 6, 1987

[54] DOUBLE-ACTION PISTON/CYLINDER UNIT

[76] Inventors: Josef Büter, Neue Industriestr.1; Heinrich Büter, Dorfstr 12, both of D-4472 Haren OT-Altenberge, Fed. Rep. of Germany

[21] Appl. No.: 684,846

[22] Filed: Dec. 21, 1984

[51] Int. Cl.$^4$ .............................................. F16D 31/02

[52] U.S. Cl. .......................................... 60/413; 91/5; 91/422; 91/437; 92/134

[58] Field of Search ................ 92/130 B, 134; 91/422, 91/437, 5; 60/413

[56] References Cited

U.S. PATENT DOCUMENTS

| | | | |
|---|---|---|---|
| 3,476,016 | 11/1969 | Dixon | 91/422 |
| 3,570,244 | 3/1971 | Strobel | 92/134 |
| 4,226,167 | 10/1980 | Lew | 92/134 |
| 4,508,017 | 4/1985 | Montabert | 92/134 |

*Primary Examiner*—Abraham Hershkovitz

*Attorney, Agent, or Firm*—Hill, Van Santen, Steadman & Simpson

[57] ABSTRACT

A double action piston/cylinder unit has a piston guided in a cylinder and attached to a piston rod, the piston to be charged with a pressure agent, particularly hydraulic fluid at a first end face, the hydraulic fluid to be conducted in a controlled manner into the cylinder via a first fitting disposed at an end section of the cylinder and is to be charged at its other, second end face with a pressure agent which is located in an annular chamber formed by a central section of the piston rod and the inner wall of the cylinder, the second end face of the piston and a cylinder end piece, the annular chamber is in communication with a pressure agent reservoir which is connected to the annular chamber via a second fitting disposed at the other end section of the cylinder. A connecting line by way of which a pressure compensation can occur when the piston is charged at its first end face is provided between the first fitting and the second fitting, the connection being interrupted when the piston is not charged by the pressure agent under pressure at its first end face.

1 Claim, 1 Drawing Figure

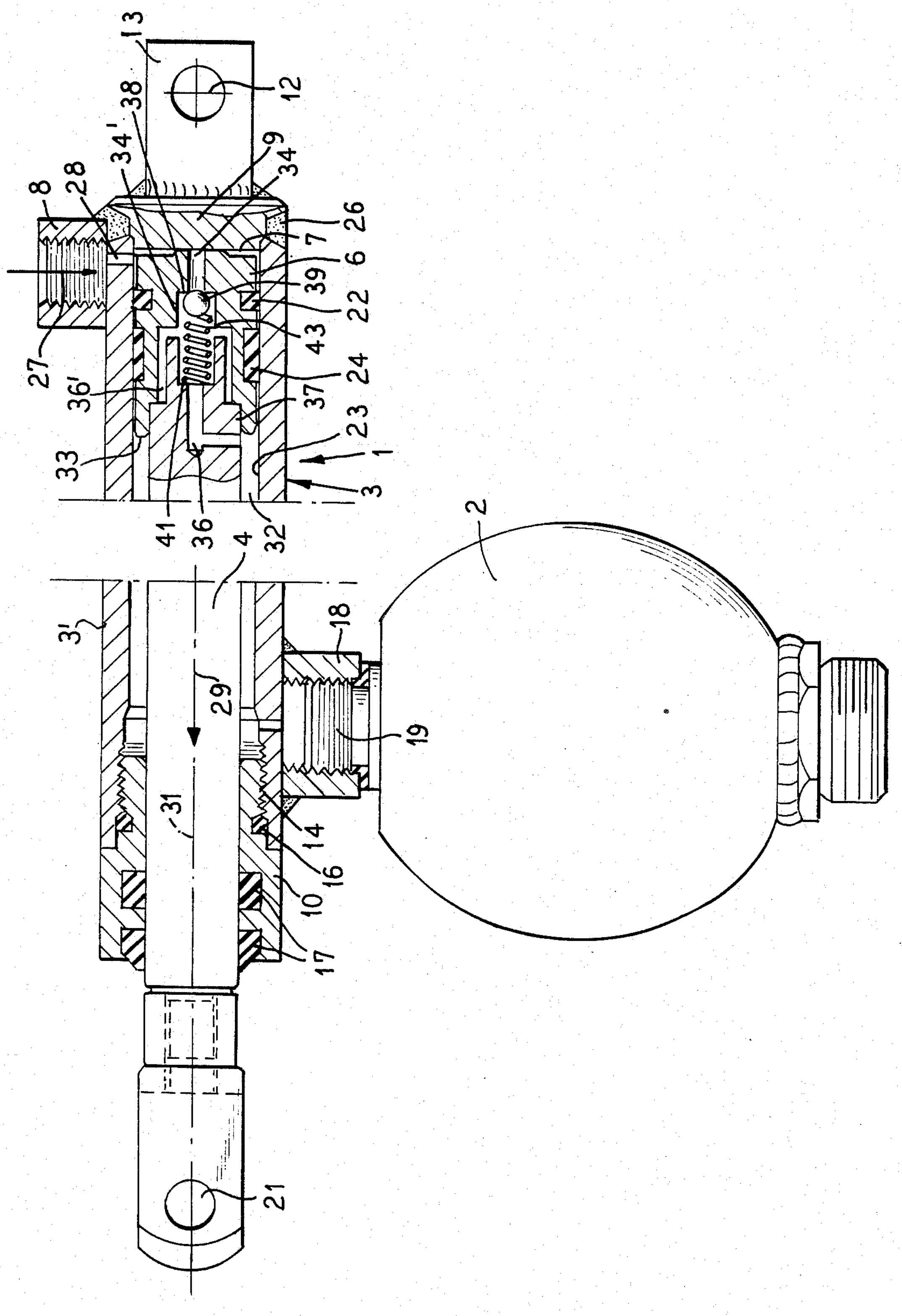
13
12
38
34'
9
34
8
28
26
7
6
39
22
43
24
27
36'
37
23
1
33
3
41
36
4
32
2
3'
18
29
19
31
14
16
10
17
21

DOUBLE-ACTION PISTON/CYLINDER UNIT

BACKGROUND OF THE INVENTION

1. Field of the Invention

The present invention relates to a double action/cylinder unit in which the piston is guided in the cylinder and is attached to a piston rod. The cylinder is to be charged with a pressure agent, particularly hydraulic fluid via a first fitting at a first end face, the pressure agent being fed through the first fitting in a controlled manner and the cylinder is to be charged at another, second end face with a pressure agent via a second fitting which is in communication with an annular chamber formed by the central section of the piston rod, the inner wall of the cylinder, a second end face of the piston and a cylinder end piece, the second fitting providing communication between the annular chamber and a pressure agent reservoir.

2. Description of the Prior Art

Such piston/cylinder units of the type set forth above are generally hydraulically operated and, in accordance with standard terminology employed in practice shall be referred to below as a hydro-cylinder.

Double action hydro-cylinders heretofore always had two fittings for the pressure agent respectively located at the end sections of the cylinder, i.e. fittings usually for hydraulic fluid, between which a connecting line with a corresponding reverse valve was provided and with which each of the first or second piston end face was to be selectively charged dependent on the desired position of the piston rod. The control valve, the connecting line and the second fitting, etc., are, however, a matter of component parts which are definitely of considerable expense for such hydro-cylinders and which lead to a great cost reduction when they can be eliminated. In addition, a second pressure agent fitting for a second pressure agent line was also not desired for reasons of assembly, space and the like, particularly given apparatus to be equipped with such double action hydro-cylinders which must otherwise be designed in an extremely cost-effective manner in order to be competitive in the marketplace.

Consequently, a piston/cylinder unit without a second fitting and, of course, without a corresponding connecting line and without a correspondingly-complicated control valve, etc., has been developed and the return of the piston rod is effected by way of an externally-disposed spring. Given the embodiment discussed herein, this spring is placed under tension when the piston is charged with the pressure agent. When the charging of the pressure agent is discontinued and the connecting line for reflow is released, then, given such a hydro-cylinder, the spring under corresponding tension in this extended position sees to it that the piston rod returns to its initial position.

Such externally-disposed tension springs, however, are extremely undesirable in numerous applications. They are not only considered dangerous by the trade associations (and therefore need a certain encapsulation or the like, this increasing the expense) but are also not welcomed by the users, apart from the fact that such a design makes a rather provisional impression and is also exposed to a variety of disruptive influences.

For the above reasons, hydro-cylinders having so-called hydraulic accumulators have been developed, i.e. the second fitting has in fact been provided, as in the embodiment initially described, but is not connected to a connecting line for a pressure agent, but rather to a hydraulic accumulator. The hydraulic accumulator will be explained in greater detail below with reference to the illustrative embodiment of the present invention, the accumulator comprising an essentially closed housing in which a diaphragm is disposed, a pressurized gas (generally nitrogen) being located on one side of the diaphragm in a closed chamber defined by the corresponding housing section and the diaphragm, whereas the opposite side of the diaphragm is connected to the remaining part of the housing comprising the fitting, this connection being effective by way of that fitting of the cylinder. When the hydraulic accumulator is charged with a pressure agent of the hydro-cylinder via its fitting, then the pressure agent compresses the gas in its chamber upon deformation of the diaphragm and builds up a corresponding pressure which, dependent on the pressure conditions prevailing at the fitting of the hydraulic accumulator, can definitely be discharged, in turn, to the exterior, i.e. into the annular chamber of the hydro-cylinder in this case.

Such hydro-cylinders of the type having a hydraulic accumulator have been well received, particularly since the hydraulic accumulators are currently manufactured in such high piece numbers that the unit price is relatively low. However, they still have the substantial disadvantages which particularly reside in the fact that, when the operations are initiated, a filling of the annular chamber and of the hydraulic accumulator with a pressure agent must be carried out first and, over and above all else, that due to the constantly persisting leakage losses (of hydraulic fluid) at the piston rod and, or at the piston side, a pressure decrease arises in the system of the annular chamber/hydraulic accumulator which necessarily leads to an outage of the piston/cylinder unit after a certain operating time.

SUMMARY OF THE INVENTION

The object of the present invention is to provide the piston/cylinder unit of the type generally set forth above while avoiding the aforementioned other disadvantages to the effect that no decay of pressure arises due to the fundamentally unavoidable leakage losses and the piston/cylinder unit remains operational despite the necessarily-occurring leakage losses. Further, a separate filling operation of the annular chamber of the hydraulic accumulator with a pressure agent under a corresponding pressure should also be capable of being eliminated. A further object is to provide that a repair or, respectively, replacement of the piston/cylinder unit or of the hydraulic accumulator may be carried out by a laymen without difficulty given operational disruptions and without the person being subjected to any hazard whatsoever. Finally, further savings or, respectively, cost reductions in comparison to the aforementioned unit should be possible on the basis of the present invention in that the piston/cylinder unit of the present invention allows the use of standard seals (in comparison to the special seals known in the art of the units described) and, in addition, such high demands made of the surface qualities of the inner wall of the cylinder are not made as was heretofore required in the art.

The above object is achieved, according to the present invention, in that a connecting line by way of which a pressure compensation can occur when the piston is charged at its first end face by the pressure agent is provided between the first fitting and the second fitting of the piston/cylinder unit, and in that the connecting line is interrupted when the piston is not charged by the pressure agent at its first end face, i.e. the intake and discharge line connected to the first fitting is "open", (without pressure), and the pressure agent, generally hydraulic fluid, flows back in a known and standard manner, whereby only a simple ball cock or the like need be present as a control or, respectively, shutting member in the line leading to the first fitting of the piston/cylinder unit.

The connecting line is preferably disposed within the cylinder and in accordance with a preferred embodiment of the invention it extends through the piston and a section of the piston rod, whereby a check valve can be disposed in the connecting line for realizing the aforementioned blocking measure.

In a particularly simple, rugged, operationally-reliable and, in particular, an extremely cost-effective embodiment, the connecting line is designed as a double bore which extends from the first end face of the piston up to a circumferential section of the piston rod which is always in communication with the annular chamber. The check valve is preferably composed of a ball and a compression spring which is supported at its one end at the piston rod and at the ball at its other end and presses the ball against a ball seat in the direction towards the first end face of the piston, whereby the bias of the spring is preferably variable, by way of interchange under given conditions, in order to be able to realize different countermeasure conditions and without requiring further manipulations.

In order to guarantee that when the first end face of the piston is charged with a pressure agent, a pressure compensation to the annular chamber and, therefore, to the hydraulic accumulator can occur, as described in greater detail below, and whereas the pressure compensation is interrupted in the other operating condition, it is preferably provided that the ball, given pressure charging by the pressure agent at the first end face of the piston, presses against a second ball seat upon elastic deformation of the spring, whereby a flow path through which the pressure agent can flow is provided with the seating of the ball at the second ball seat. The flow, according to a particular feature of the invention, can be designed as at least one slot-like recess at the second ball seat, the slot-like recess always connecting the two sections of the connecting line lying adjacent to the second ball seat at both sides thereof to one another.

BRIEF DESCRIPTION OF THE DRAWING

Other objects, features and advantages of the invention, its organization, construction and operation will be best understood from the following detailed description, taken in conjunction with the accompanying drawing on which there is a single FIGURE showing, partially in section, a piston/cylinder unit constructed in accordance with the present invention.

DESCRIPTION OF THE PREFERRED EMBODIMENTS

Referring to the drawing, a double action piston/cylinder unit 1 comprises a pressure agent accumulator 2 for hydraulic actuation, i.e. a hydro-cylinder having a hydraulic accumulator, whose piston 6 is guided in a cylinder 3 secured to a piston rod 4 is to be charged with hydraulic fluid at its one end face 7 referred to above and hereinafter as the "first" end face, the hydraulic fluid to be conducted into the cylinder 3 in a controlled manner via fitting 8 located at an end section of the cylinder 3.

As shown, the cylinder 3 essentially -comprises a tubular section at whose ends a respective cylinder end piece 9, 10 is disposed. The cylinder end piece 9 has a link projection 13 welded thereto, the link projection 13 being provided with a bore 12. The cylinder end piece 9 is, in turn, welded to the tubular section 3'.

At the opposite end, the tubular section 3' is releasably connected to the cylinder end piece 10 so that the assembly and, under given conditions, disassembly of the piston rod 4 of the piston 6 can be executed. The bushing like cylinder end piece 10 is provided with an external thread 14 and is screwed into a corresponding inner thread located at the respective end of the tubular section 3'. In order to achieve the required tightness, a seal 16 is located between the cylinder end piece 9 and the inside of the tubular section 3' of the cylinder 3, this seal being a matter of a normal standard seal.

Two further seals 17 are disposed at the same end of the piston/cylinder unit 1 between the piston rod 4 and the inside of the cylinder end piece 10 which is circular in cross section.

Located at this same end of the piston/cylinder unit 1 is a second fitting 18 for the hydraulic accumulator 2, the accumulator 2 being screwed into the fitting 18 with a connector 19 which is provided with a corresponding outer thread.

The distal end of the piston rod 4 comprises a bore 21 just as the link projection 13 and, as is centrally equipped with a slot (not shown) which extends from its free, outer end via a section in the direction towards the opposite end of the piston rod 4, as is well known per se.

The piston 6 which likewise comprises a seal 22 relative to the inner wall 23 of the cylinder is also provided with a guide band 24 at its circumferential surface and comprises a projection at its radially extending first end face 7 for preventing the first end face 7 from being placed in full dimension against the inside of the cylinder end piece 9 so that a space 26 remains free. As can be seen from the drawing, such a space 26 is always present so that a pressure can be built up in that space when a pressurized agent is supplied via the connecting line (not shown) to the first fitting 8 in the direction of the arrow 27, the agent flowing into the space 26 from the fitting 8 by way of a bore 28 in the wall of the cylinder 3.

When, for the purpose of actuating some type of device, apparatus or part not shown on the drawing, the piston rod 4 is moved toward the left in the direction of the arrow 29 from the one final position shown in the drawing, then the appertaining operator opens a ball valve disposed in the line connecting the first fitting 8 and hydraulic fluid flows in the direction of the arrow 27 into the space 26, whereby a force is thus exerted on the piston 6, the force corresponding to the product of the built-up pressure (for example, 180 bar) multiplied by the projected area of the first end face 7 onto a plane extending at right angle relative to the center line 31 and a movement of the piston rod 4 in the direction of the arrow 29 occurs due to this pressure.

Without discussing how the pressure agent proceeds into the annular chamber 32 and how pressure is built up therein, the same shall be assumed here, in accordance with the normal operating condition, so that it can be accordingly determined that the annular, second end face 33 of the piston 6 exerts a pressure on the hydraulic fluid located in the annular chamber 32 so that the hydraulic fluid, given movement of the piston rod 4 and of the piston 6, escapes toward the left in the direction of the arrow 29 via the fitting 18 and into the hydraulic accumulator and therein presses against the diaphragm described above so that the gas fill (nitrogen) present in a closed chamber at the other side of the diaphragm is correspondingly compressed.

It should be pointed out that the area of the second end face 33 of the piston 6 is smaller than that of the first end face 7 so that lower pressure prevails in the annular chamber 32 than in the space 26 in the normal operating condition given charging of the space 26 with a pressure agent.

When, for the purpose of a corresponding return actuation of the apparatus or the like to be actuated with the piston/cylinder unit 1, a return motion opposite the arrow 29 is to occur, the operator also actuates the ball cock (not shown on the drawing) so that a pressure agent is no longer supplied to the fitting 8 and, therefore, to the space 26. To the contrary, the line connecting to the first fitting is then "open" and without overpressure for the return flow of hydraulic fluid. The pressure required for this purpose is exerted by the hydraulic accumulator 2 which maintains the hydraulic fluid present in the annular chamber 32 under a corresponding pressure and need only effect an expulsion without substantial counter-pressure during the return motion.

As mentioned above, however, certain leakage losses at the seals 16, 17 necessarily occur during the course of operation which would, finally, lead to an outage of the piston/cylinder unit 1 if the leakage losses are not compensated (under corresponding pressure).

Just like the initial filling of the annular chamber 32 or, respectively, of the pressure agent accumulator 2, this occurs automatically given the embodiment of the invention described herein in that a connection has been created between the first fitting 8 and the second fitting 18 so that a pressure compensation is always capable of occurring via the connection when the piston 6 is charged by the pressure agent applied to the first end face 7, whereas the connection is interrupted when the piston 6 is not charged at the first end face 7 by the pressure agent, the intake line being open and the hydraulic fluid refluxing. This connecting line, as may be seen from the drawing, is disposed within the cylinder 3 and extend, in particular, through the piston 6 and a section of the piston rod 4. The piston 6 is provided with a bore 34 and the piston rod 7 is provided with a bore 36 extending along the central axis 31 and a radially extending bore 37 connects the bore 36 in communication with the annular chamber 32 in all positions of the piston.

As may also be seen from the drawing, the bore 34 in the piston 6 comprises an enlarged section 34' facing the piston rod 4 and forms a seat 38 for a ball 39 which has a diameter smaller than the length of the section 34'. The bore 36 also comprises an enlarged section 36'. A biased compression spring 41 is disposed in the section 36' and is supported at its one end against a shoulder 32 and at its other end against the ball 39 so that the compression spring 41 initially holds the ball in engagement at the ball seat 38.

When the space 26 is charged by the application of the pressure agent in accordance with the arrow 27 and when the piston also moved toward the left in the direction of the arrow 29, the pressure agent can also flow into the bore 34 of the piston 6 and press the ball 39 against the action of the compression spring 41, whereby the ball 39 is seated against the free end of the enlarged section 36'. However, it does not seal off the section 36' and, therefore, the pressure agent is capable of flowing out of the bore 34 into slots 43 and into the bore 36.

When initiating operations, the foregoing occurs once, i.e. in addition to the space 26 and the bore 34, 36, the annular chamber 32 is also filled with hydraulic fluid and, via the second fitting 18, so is the corresponding part of the hydraulic accumulator until, due to the geometrical conditions, a state of equilibrium arises when the piston rod 4 has moved completely to the left in the direction of the arrow 29.

When, in this position, the pressure existing at the intake line and, therefore, at the first fitting 8 has been removed by actuating the ball valve (not shown), then the consequence thereof is that the pressure prevailing in the hydraulic accumulator 2 and in the annular chamber 32 acts not only on the second end face 33 of the piston 6 but also acts via the bores 37, 36, 36' on the ball 39 so that the same is pressed into the position illustrated in which it also presses tightly against the ball seat 38 so that the hydraulic fluid located on the other side of the ball 39 flows out opposite the arrow 27 but the pressure agent (under a corresponding pressure) remains in the annular chamber 32 and in the hydraulic accumulator 2.

It may be seen that the potential leakage losses are automatically compensated in accordance with the same principle based on which the initial filling occurred and that, accordingly, a pressure decay does not occur over the course of operations, this requiring a complicated refilling under corresponding pressure, etc.

For the same reasons, it is likewise abundantly clear that the piston/cylinder unit constructed in accordance with the present invention makes due with standard seals and not particularly high-quality surfaces since, in particular, the magnitude of the leakage loss (within reasonable limits, of course) is completely non-critical in contrast to the above-described art. This, however, also results in a longer useful life since, as known, seals having low leakage losses require higher compression forces at the sealing surface which, in turn, lead to correspondingly higher wear given a corresponding relative movement.

The piston/cylinder unit of the present invention also meets all of the tasks in accordance with the requirements made thereof in an optimum manner, whereby the measures undertaken to this end, namely the fashioning of the bores 34, 36 as well as the provision of the compression spring 41 and the ball 39 can be practiced with extremely little expense, since the piston rod has been already chucked for processing and additional alignment work is not required in order to manufacture the bores. As may be seen, the mounting of the spring and of the ball is as simple as conceivably possible and added thereto is that these added costs are at least partially compensated by the fact that the inner wall 23 of the cylinder 3 does not require any particularly high planishing requirements and, further, the seals to be utilized are considerably more cost-effective as a result of their standard constructions than the special seals that must be provided in the art heretofore known in order to be able to maintain the leakage losses and the pressure drop connected therewith as small as possible.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A double action piston/cylinder unit comprising:

a cylinder including first and second ends and first and second spaced apart pressure agent fittings in fluid communication with the interior of said cylinder;

a piston slidably mounted in said cylinder and including first and second ends for acting on and being acted on by a pressure agent;

first and second end pieces sealing said first and second ends of said cylinder;

a piston rod connected to said second end of said piston and slidably and sealingly received through said second end piece, said piston rod and said second end piece and said second end of said piston forming an annular chamber in said cylinder in communication with said second pressure agent fitting;

an accumulator connected to said cylinder and connected in communication with the annular chamber via said second pressure agent fitting for receiving and expelling the pressure agent; and pressure compensation means, including a connecting line and a check valve means in communication with said connecting line, extending between the annular chamber and said first pressure agent fitting, said check valve means operable in response to the application of an operating pressure by a pressure agent through said first pressure agent fitting acting on said first end of said piston to connect said first and second pressure agent fittings via said connecting line and operable in response to the lack of operating pressure on said first end of said piston and the application of operating pressure on said second end of said piston via said accumulator, said second pressure agent fitting and the annular chamber to disconnect said first and second pressure agent fittings, said connecting line extending from said first end of said piston to said annular chamber via the end of said piston rod which is connected to said piston, said connecting line comprising a first bore extending through said piston, a second bore aligned with said first bore and extending longitudinally of said piston rod, and a third bore extending radially of said piston rod and communicating with said second bore and the annular chamber, said check valve means further comprising a spring mounted in said second bore, a valve seat in said first bore and a ball mounted in said first bore and urged against said valve seat by said spring, said second bore of said connecting line comprising a further valve seat for receiving said ball in response to the application of the operating pressure acting on said first end of said piston and elastic deformation of said spring, and said check valve means further comprising a first counterbore of said connecting line receiving said ball, a second counterbore of said connecting line in said piston rod receiving said spring, and a recess in said piston connecting said first and second counterbores.

* * * * *